United States Patent [19]

Pippert

[11] Patent Number: 5,070,639
[45] Date of Patent: Dec. 10, 1991

[54] FISHING LURE SYSTEM AND RATTLE THEREFOR

[76] Inventor: Aaron J. Pippert, P.O. Box 79227, Houston, Tex. 77279

[21] Appl. No.: 577,435

[22] Filed: Sep. 4, 1990

[51] Int. Cl.$^5$ .............................................. A01K 85/00
[52] U.S. Cl. ................................ 43/42.31; 43/42.24; 43/42.39; 43/42.09
[58] Field of Search ................ 43/42.31, 42.09, 42.24, 43/42.28, 42.38, 42.39, 42.5

[56] References Cited

U.S. PATENT DOCUMENTS

| | | |
|---|---|---|
| 3,831,307 | 8/1974 | Pittman . |
| 3,848,353 | 11/1974 | McClellan . |
| 3,895,455 | 7/1975 | Johnston . |
| 3,909,974 | 10/1975 | Kent . |
| 3,921,328 | 11/1975 | Holcombe . |
| 3,971,152 | 7/1976 | Husson, Jr. . |
| 3,988,851 | 11/1976 | Sacharnoski, Sr. . |
| 4,203,246 | 5/1980 | Sacharnoski, Sr. . |
| 4,432,157 | 2/1984 | Growing ........................ 43/42.31 |
| 4,573,283 | 3/1986 | Pippert . |
| 4,581,839 | 5/1986 | Mattison . |
| 4,589,221 | 5/1986 | Mattison . |
| 4,638,584 | 1/1987 | Lindsay . |
| 4,672,768 | 6/1987 | Pippert . |
| 4,700,503 | 10/1987 | Pippert . |
| 4,712,326 | 12/1987 | Hoover et al. .................. 43/42.31 |
| 4,791,750 | 12/1988 | Gammill ........................ 43/42.31 |
| 4,839,983 | 6/1989 | Pippert . |
| 4,918,854 | 4/1990 | Webre, Jr. ..................... 43/42.31 |
| 4,920,686 | 5/1990 | McGahee et al. ............... 43/42.24 |

OTHER PUBLICATIONS

Vortex Lures Catalog 1987, Vortex Div., Utex Industries, Inc., Kalispell, Mont. 59901.

Primary Examiner—Richard K. Seidel
Assistant Examiner—Patty E. Hong
Attorney, Agent, or Firm—Browning, Bushman, Anderson & Brookhart

[57] ABSTRACT

A fishing lure system comprises a rigid head and a body having a leading surface adjacent the head. The body, preferably flexible, extends rearwardly from the leading surface and removably receives a shank extending rearwardly from the head. The body has a rattle cavity with a mouth opening through the leading surface and offset from the shank. A rattle assembly, preferably longer and wider than it is high, is removably disposed in the cavity. The system may further comprise a different type of lure, such as a spoon-type lure, adapted to removably receive the same rattle assembly which is disposed in the aforementioned cavity.

23 Claims, 1 Drawing Sheet

FISHING LURE SYSTEM AND RATTLE THEREFOR

BACKGROUND OF THE INVENTION

1. Field of the Invention

The present invention pertains to fishing lures.

2. Description of the Background

A number of efforts in the prior art have been directed at providing a lure which will produce a rattling sound as it is moved through the water. However, the resulting lures have suffered from one or more of a number of disadvantages. One of these is complication of construction. Another is lack of versatility: either the lure had a rattle, or it did not; it could not be converted from rattling to non-rattling forms. Even in those cases in which a more or less ordinary lure could be modified to receive a rattle, the procedure for mounting the rattle on or in the lure was troublesome and not easily reversed. Another problem is that, in some designs, the rattle is affixed externally to the lure body, where it is vulnerable and may also affect the action of the lure in the water. Still another problem with many prior art rattling lures is that the form of the rattle, and/or the way in which it has to be mounted on or in the lure, restricts the available space for movement of the relatively moving parts of the rattle, thus also limiting the sound which could be produced thereby.

U.S. Pat. No. 3,909,974 illustrates several of these problems. The lure is of the weighted head type, i.e. having a hard, solid head, typically of a heavy metal, and from which a hook depends. A flexible body portion can be removably mounted on the hook. The rattling means are permanently mounted in a cavity in the head, with the head in turn being fairly complicated to manufacture and assemble. Also, the space available for relative movement of the rattling means is restricted.

U.S Pat. Nos. 3,988,851 and No. 4,203,246 disclose a form of rattle which is intended to be selectively emplaced on or in conventional lures. However, the process of doing this is troublesome. In order to mount the rattle in a lure body, a hole must be formed, either by drilling or by pushing with a sharp instrument, depending upon the hardness of the lure body. The form of the rattle case must be narrow, so it can fit in the kind of hole the user can make in this manner, and this shape restricts relative movement of the rattle means therein. After the rattle is emplaced in the lure body, the body must be sealed so that the rattle cannot escape, either by pinching together a soft lure body or by plugging a hard lure body. This is likewise troublesome, and also makes it difficult, if not virtually impossible, to return the lure body to its original form if desired.

The latter two patents also contemplate that the rattle could simply be glued or taped to the outside of a lure body. Clearly, this would also be troublesome, and could affect the action of the lure in the water. In addition, it would make the rattle more vulnerable, a particular problem for this device wherein the rattle case is formed of glass.

U.S. Pat. Nos. 3,831,307 and No. 3,848,353 disclose rattles which are mounted on the exterior of a lure body, with the disadvantages mentioned above in that regard. In addition, they are more complicated than is necessary, and the '353 Patent device has unduly restricted rattle space.

It has also been known to make hard body lures, such as plastic fish-shaped lures, with hollow bodies having movable rattling means therein. Examples have been sold by Bill Lewis Lures, Alexandria, La., under the trademark Rat-L-Trap and by Vortex Lures, Kalispell, Mon., under the trademarks Vortex and Lightnin Darter. Clearly, these require special manufacturing techniques and are not at all versatile or convertible. They cannot be applied to lures with soft bodies.

The present invention addresses the above problems in general. More specifically, however, the present invention seeks to provide a rattling lure, and a selectively emplaceable and removable rattle for lures, which are compatible with modular lure systems.

Such modular lure systems are exemplifed in U.S. Pat. Nos. 4,839,983, No. 4,672,768, No. 4,573,283 and No. 4,700,503, as well as in a catalog-type publication entitled "Vortex Lures."

U.S. Pat. Nos. 4,573,283 and No. 4,700,503 disclose a modular lure system or subsystem wherein spoon-type lure bodies can be fitted with different hard inserts to change their shape, and thus their action in the water, while conversely, a given insert can be fitted with different lure bodies which may have different colors or other characteristics.

U.S. Pat. No. 4,672,768 discloses another system or subsystem comprising lures of the weighted head type having improved means for assembling different body portions selectively with a given weighted head.

U.S. Pat. No. 4,839,983 shows how both of the aforementioned subsystems can be modified to easily and selectively accept fish attractant devices, such as chemiluminescent devices or olfactory devices. In each subsystem, the existing way of interconnecting the flexible portion of the lure with the hard portion also serves to hold the fish attractant in place. In the case of the weighted head-type lure, the fish attractant can be placed in the same cavity with the shank which extends from the weighted head, the soft rear body portion stretching and deforming to accept it. In the spoon-type subsystem, a recess or hole is provided in the hard metal insert, and the fish attractant is confined therein by the surrounding lure body.

SUMMARY OF THE INVENTION

The present invention contemplates such a system which comprises at least one weighted head type lure. This weighted head type lure comprises a rigid head portion and a body portion, preferably flexible, having a leading surface adjacent the head portion and extending rearwardly therefrom. There are means provided to releasably retain the two portions of the lure in a connected configuration, with the leading surface of the body portion adjacent the head portion. Preferably, this means includes a shank which extends rearwardly from the head into the body portion and carries means, such as a fish hook and/or a retaining barb, which hold the body in place adjacent the head.

The shank is preferably displaced, preferably downwardly, from the center of the leading surface to allow room for a preformed rattle cavity in the body portion and having a mouth opening through the leading surface thereof. This cavity is offset from the shank, and preferably also from the center of the leading surface, but in the opposite direction from the shank, preferably upwardly. A rattle assembly is removably disposed in the cavity.

The rattle assembly preferably comprises a hollow case with rattling means therein. The interior, and preferably also the exterior, dimensions of the case are such that its length and width are substantially greater than its height, and it is disposed in the mating cavity with the height lying parallel to the leading surface of the body portion of the lure. The rattling means preferably have a maximum dimension less than the minimum of the interior height.

The system may also include another type of lure, such as a spoon-type lure, which is adapted to removably receive the same rattle as the first lure.

It will be seen that such a system provides a high degree of versatility. A rattle, standardized for the particular system, can be employed in virtually any type of two-part lure desired. The two-part form of the various types of lures allow there to be preformed cavities and/or holes in which the rattle assembly can be easily emplaced, and from which it can be easily removed, without the necessity for the user to physically modify the lure body.

Nevertheless, and again due to the two-part construction of the lures, the cavity is closed when the lure is assembled by the same means normally used to retain the two parts of such lures in a connected configuration. This means not only that the rattle assembly is automatically retained in place while the lure is in use with it, but also that, if the rattle assembly is removed, the external appearance of the lure, its size, its shape and its action in the water, are not significantly affected.

The form of the lure makes it particularly well adapted for use in both of the types of lures contemplated for this system, i.e. the weighted head-type and the spoon-type. Yet, at the same time, because of the way the rattle is mounted in the lure, the rattle can be formed in such a way that, while small, it allows ample travel for the internal rattling means, so that good sound production is achieved.

Another advantage of the way in which the rattle assembly is mounted in the basic weighted head type lure is that, being mounted in the leading portion of the body, and preferably toward the top side, the width of the rattle can be maximized, again to optimize sound production. Also, because of being mounted in the leading portion of the body, parallel to the shank which preferably extends from the head into the body, then even if a fish bites off the trailing flexible tail of the body, the rattle is unlikely to be lost.

Since both the length and the width of the rattle are maximized, the rattling means have plenty of potential travel. Good sound production is achieved whether the rattle is used with the weighted head-type lure, wherein the body sways up and down or back and forth in the water, or the spoon-type lure, wherein the action involves a flip-flop motion.

Numerous objects, features and advantages of the invention will be made apparent by the following detailed description, the drawings and the claims.

DETAILED DESCRIPTION

Figure 1:
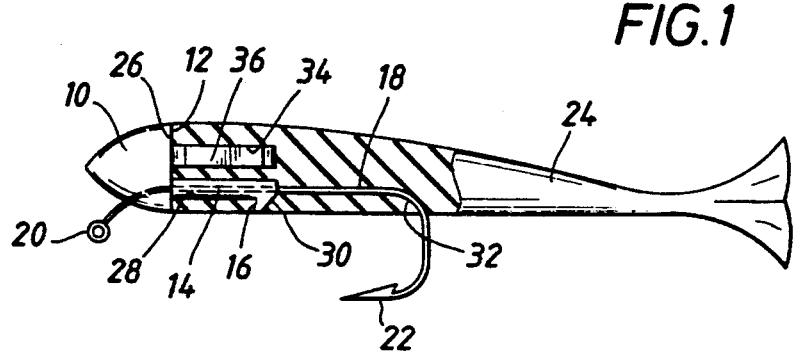
FIG. 1 is a side view, partly in longitudinal cross section, of a first embodiment of lure according to the present invention.
Figure 2:
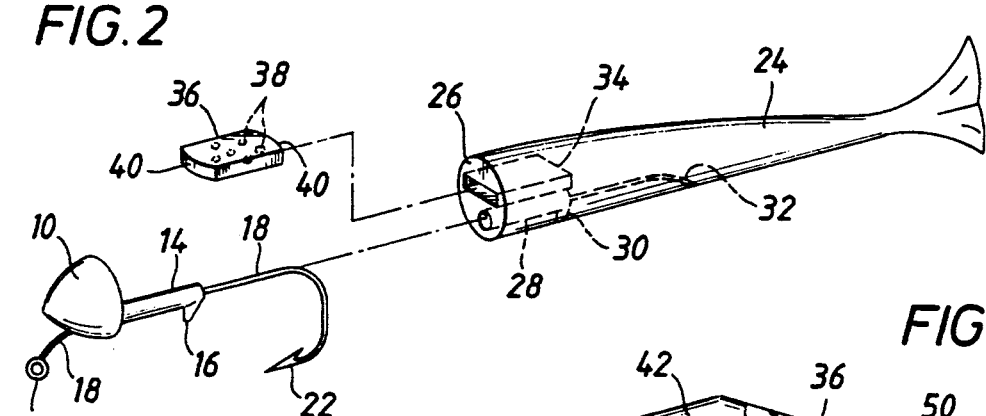
FIG. 2 is an exploded perspective view of the embodiment of FIG. 1.

Referring first to FIGS. 1 and 2, there is shown a lure assembly which can also be considered a simple form of lure system according to the present invention. This first assembly is of the weighted head type, comprising a rigid head 10 formed of lead or other heavy metal. Head 10 has an aerodynamic leading surface and a flat trailing surface 12 which, in the idealized position of use as shown in FIG. 1, is disposed vertically.

A shank 14, formed integrally with head 10 and of same material, extends rearwardly from surface 12 in a position spaced downwardly from the center of head 10 and its surface 12. (Terms such as "upwardly" and "downwardly" are used herein for convenience, to refer to the idealized positions of use as shown in the drawing, and are not to be construed in a limiting sense.) The shank includes a retaining barb 16, also integrally formed therewith, extending downwardly from the free end of the shank.

A fish hook 18 is rigidly held in the head portion 10, 14 of the assembly. For example, head portion 10, 14 may be molded about the fish hook 18. The precise positioning of the fish hook 18 is such that the front portion thereof, including an eyelet 20, projects from the head portion, the straight portion of the hook 18 extends through shank 14 and rearwardly therefrom, and the trailing portion of the hook, carrying barb 22, extends downwardly, with barb 22 itself jutting forward at the free end of the hook.

The lure further comprises a soft, flexible body portion 24 which may be formed of any suitable plastic, natural or synthetic elastomer. The material should be flexible enough so that the tail end of body 24 can wiggle as the lure is moved in the water to simulate live bait. The body 24 has a flat leading surface 26 sized to match the trailing surface 12 of head 10. Two preformed cavities in body 24 have their mouths opening through surface 26.

The first, lower or "shank" cavity removably receives the shank 14 and the rearwardly adjacent portion of fish hook 18. This first cavity includes a straight longitudinal run 28, which includes the mouth opening through surface 26. Run 28 may be stepped to follow the diameters of shank 14 and hook 18. The shank cavity also includes a first generally radial branch 30, extending downwardly and opening through body 24 intermediate the ends of run 28, and a rear generally radial branch 32 extending downwardly and rearwardly from the rear end of run 28 and opening through body 24.

Except for the fact that the cavity 28, 30, 32 is displaced downwardly from the center of surfaces 12 and 26, it may be generally similar to the cavity described in my prior U.S. Pat. No. 4,672,768. Likewise, the manner in which hook 18 and shank 14 can be inserted into runs 28 and 32 by the user to attach a given body 24 to a given head 10 is as described in said prior patent. Thus, the procedure will not be reiterated in full detail herein. It is noted that, in inserting the hook 18 and shank 14, barb 16 is worked into branch 30. Barb 16 has a rear surface which is inclined forwardly and downwardly, so as to ease insertion, but a front surface which is straight vertical, or inclined slightly forwardly and downwardly, so that the interaction of barb 16 and cavity run 30 retain shank 14 in run 28, thus holding body 24 on head 10 with the surfaces 12 and 26 in engagement. However, barb 16 and the cooperating radial run 30 of the first cavity are preferred features. The downwardly depending portion of fish hook 18 will also cooperate with run 32 to help retain body 24 on head 10, and in some cases, might be used alone.

The second, upper or "rattle" cavity 34 is a blind cavity having its mouth opening through surface 26 and extending rearwardly therefrom. Cavity 34 is displaced upwardly from cavity 28, 30, 32, and also from the center of surface 26. Cavity 34 is generally in the form of a rectangular parallelepiped. It has a height, measured generally vertically as shown, a length measured generally parallel to the length of body 24, and a width measured transversely across body 24. The length and width are substantially greater than the height.

A rattle assembly, including a hard, rigid outer case 36 and internal rattling means 38, is removably inserted in cavity 34 through the forward mouth thereof. Then, when the body 24 and head portion 10, 14 are assembled together, the same means 16, 30 and/or 18, 32 which retain body 24 adjacent head 10, will also retain rattle 36 by virtue of the fact that the rear or trailing surface 12 of head 10 covers the mouth of cavity 34.

The outer case 36 of the rattle assembly has similar exterior dimensions to those of cavity 34, except that its length and width vary slightly to provide curved end surfaces 40.

The rattling means 38 are preferably in the form of small spheres of some material hard enough to produce a rattling sound as they move within the case 36. For example, small shot may be used. In any event, the spheres 38 have a diameter or maximum transverse dimension smaller than the smallest dimension of the interior of case 36. Since the interior dimensions of case 36 follow the exterior dimensions, so that the interior height is substantially smaller than the interior length and width, this means that the diameter of the rattling means 38 is smaller than the interior height of the case 36 (see FIG. 4). That interior height is preferably constant, as is the exterior height. This allows a maximum amount of travel, both lengthwise and laterally, and therefore a maximum amount of noise production, for a relatively small sized rattle assembly of simple form.

Movement of the weighted head type lure in use is such that the tail end of body 24 tends to wag up and down causing a tilting motion of the case 36 about a generally horizontal transverse axis. This tends to cause the rattling means 38 to move in a front-to-rear direction. The relatively great length of the case 36 allows quite a bit of travel in this direction, yet overall space is minimized by minimizing the height, since great height is not needed for good rattling action with this type of lure. The tail of body 24 may also wag transversely back and forth in use, and maximization of the lateral width of the case 36, with small rattling means 38 which therefore have quite a bit of travel, achieves the same advantages as described just above in connection with up and down wagging of the tail of body 24.

It will be appreciated that, since cavity 34 is preformed, it is quite easy for the user to emplace the rattle assembly 36, 38, if desired, when assembling the body 24 onto the head portion 10, 14. While a fish-tail type body 24 has been shown, it will be appreciated that a complete lure system would include other forms of flexible bodies which could be used with one and the same head portion 10, 14, and/or similar head portions, e.g. of different colors. Any such body could have a preformed cavity for selective receipt of the same form of rattle assembly, or even the very same rattle assembly.

There is no need for the user to in any way modify the lure body or the manner in which he assembles it onto the head portion, the latter action automatically ensuring the proper retaining of the rattle assembly in the body 24. Once the rattle is so emplaced and the lure assembled, the rattle has little affect on the shape or size of the lure body or its action in the water. Conversely, the rattle assembly can easily be removed, if desired, and once again the size, shape, and action of the lure in the water will be substantially unaffected. It is noted, in particular, that the long, broad, but relatively short configuration of the cavity 34 helps to ensure that there will be no significant collapse of the body 24 when the rattle is not used. Yet, as previously explained, these relative dimensions, along with the relative size of the rattling means 38, allow plenty of travel for the rattling means, and thus good sound production.

The position of the rattle assembly 36, 38 in the upper forward portion of the body 24 also allows for maximization of the lateral width of the rattle assembly, since the body 24 itself is relatively wide in this area. Also, because of the forward placement of the rattle assembly, and also because of the protective effect of the shank 14 lying parallel thereto, if a fish should bite off the tail end of the body 24, the chance that the rattle assembly is also lost is minimized.

Figure 3:
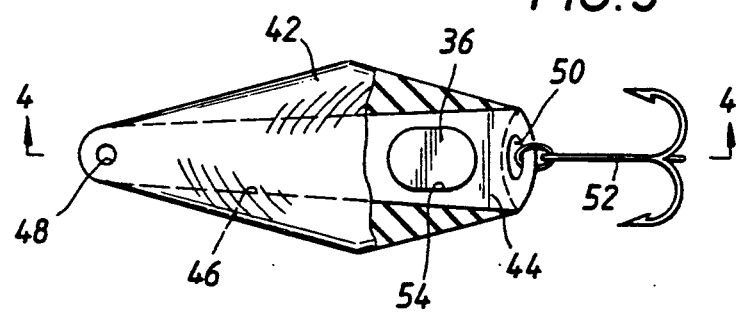
FIG. 3 is a top view, partly in cross section, of a second lure adapted to removably receive the same rattle assembly as the lure of FIGS. 1 and 2.
Figure 4:
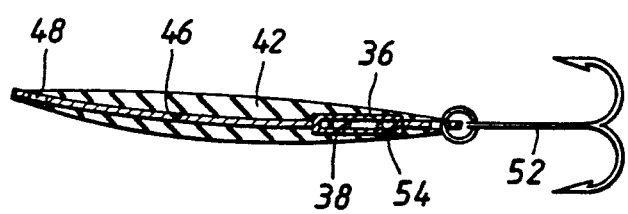
FIG. 4 is a longitudinal cross-sectional view of the lure of FIG. 3 taken on the line 4—4.

Another salient feature of the short, broad, long rattle assembly is that it can also be used in very different types of lures, also forming part of the same modular lure system. FIGS. 3 and 4 show how the rattle assembly 36, 38 can be employed in a spoon-type lure. This lure may be of the type generally described in my prior U.S. Pat. Nos. 4,573,283 and No. 4,700,583. Briefly, it comprises a spoon-type lure body 42 having a thin cavity 46 along its length and a rigid metal insert 44 received in cavity 46. When a fishing line is attached, either directly or through a suitable connector, through aligned holes 48 in the leading portions of the body 42 and the insert 44, the two are retained in assembled condition. The trailing end of the insert 44 is exposed, and includes a hole 50 for carrying a fish hook 52.

The insert 44 is provided with a vertically extending hole 54 in the broadest, i.e. rear, portion thereof. Hole 54 is sized and shaped to snugly but removably receive the same rattle assembly 36, 38 as was used in the lure of FIGS. 1 and 2. The vertically short or flattened configuration of the rattle assembly permits the body 42 to be emplaced over its insert 44 in the usual manner. Body 42, which is typically formed of a plastic material, can flex slightly, if necessary, to accommodate the extent to which the height of rattle assembly 36, 38 is slightly greater than that of the insert 44.

The advantages of being able to use the very same rattle assembly or form of rattle assembly in the various types of lures making up a complete system can be readily appreciated.

Just as this form of rattle assembly maximized sound production, and minimized space requirements and complication of construction in the first embodiment, the same form of rattle assembly achieves the same advantages in the spoon-type lure of FIGS. 3 and 4, even though the lure itself and its action in the water are quite different from those of the weighted head type lure of FIGS. 1 and 2.

Specifically, the spoon-type lure will tend to work with a flip flop action, as if rotating about its own longitudinal axis, in use. This tends to cause the rattling means 38 to move transversely across the width of the case 36. With this lateral width being relatively great, and the diameter of the rattling means 38 being relatively small, a good deal of travel is again achieved, and thus there is good sound production. Yet, the rattle assembly is flat enough to be received in the vertically thin cavity 46 without significantly altering its size, shape, or action in the water.

Figure 5:
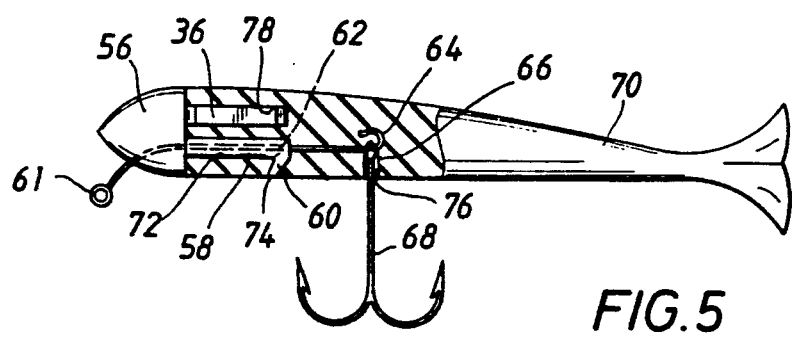
FIG. 5 is a view similar to that of FIG. 1 showing how the invention can be modified to accommodate a non-rigid hook attachment.

FIG. 5 shows how the invention can be applied to a weighted head type lure in which the fish hook, rather than being rigidly mounted in the shank of the head portion, is flexibly attached.

Specifically, the head portion of the lure of FIG. 5 includes the head proper 56 and an integral rearwardly extending shank 58, with barb 60, all substantially identical to the similar parts of FIGS. 1 and 2. A metal hook holder, formed of wire and similar to the forwardmost portions of hook 18, is embedded in head portion 56, 58 as in the first embodiment. Specifically, this holder is formed of wire and includes an eyelet 61 which projects from the head 56 and an elongate portion 62 which extends through the head 56 and shank 58 and projects rearwardly from the free end of shank 58. The rear end of holder 62 includes a catch 64 which can receive an eyelet 66 on a fish hook 68 which will therefore dangle from holder 62.

Once again, the flexible body portion 70 of the lure is provided with a first cavity having longitudinal and first radial runs 72 and 74, respectively, identical to runs 28 and 30 of the first embodiment. Run 72 receives shank 58 and the rear of holder 62. Run 74 receives retaining barb 60. The orientation of the second or rear radial run 76 has been altered slightly, to a more directly downwardly extending position, to more readily accommodate and allow dangling movement of fish hook 68. Again, a second cavity 78 is provided to removably receive the same form of rattle assembly 36, 38 as was used in the preceding embodiments.

Numerous modifications of the preferred embodiments described above will suggest themselves to those of skill in the art. For example, in other embodiments of the weighted head type lure, preformed cavities such as 28, 30, 32 might be omitted. Hook 18 and shank 14 could be forced through the flexible body, forming their own cavity. Accordingly, it is intended that the scope of the invention be limited only by the claims which follow.

What is claimed is:

1. A fishing lure system comprising:
a rigid head portion having a shank extending rearwardly therefrom;
a body portion having a leading surface disposed adjacent said head portion and extending rearwardly therefrom, said body portion removably receiving said shank, and said body portion having a rattle cavity having a mouth opening through said leading surface and radially offset from but laterally aligned with said shank, said body portion being soft and flexible rearwardly of said shank when so received; and
a rattle assembly disposed in said cavity.

2. The apparatus of claim 1 wherein said rattle assembly is removable from said cavity.

3. The apparatus of claim 2 further comprising retainer means cooperative between said shank and said body portion to releasably maintain said body portion in receiving relation to said shank and said leading surface of said body portion so adjacently disposed to said head portion.

4. The apparatus of claim 3 wherein said retainer means comprises a fish hook carried by said shank.

5. The apparatus of claim 4 wherein said hook projects rigidly from said shank and has a curved portion disposed outside body portion distal said leading surface.

6. The apparatus of claim 4 wherein said shank has attachment means accessible from the exterior of said body portion distal said leading surface, and said hook is flexibly attached to said attachment means.

7. The apparatus of claim 4 wherein said body portion further has a preformed shank cavity so receiving said shank.

8. The apparatus of claim 7 wherein said retainer means further comprises a barb extending generally laterally from said shank and projecting into said body portion.

9. The apparatus of claim 8 wherein said shank cavity includes a preformed recess for receipt of said barb.

10. The apparatus of claim 3 wherein said retainer means comprises a barb extending generally laterally from said shank and projecting into said body portion.

11. The apparatus of claim 2 wherein said rattle assembly has height extending generally parallel to said leading surface, length extending generally parallel to the front-to-rear dimension of said body portion, and width extending generally laterally of said body portion; and wherein the exterior length and width of said rattle assembly are substantially grater than the exterior height of said rattle assembly.

12. The apparatus of claim 11 wherein said rattle assembly comprises a hard hollow case defining said height, length and width, the relative sizes of the interior dimensions being similar to those of the exterior dimensions, and rattling means disposed loosely in the hollow of said case, said rattling means having a maximum dimension less than the minimum of the interior height.

13. The apparatus of claim 12 wherein said cavity is offset from the center of said leading surface.

14. The apparatus of claim 12 wherein said width and length vary to provide curved front and rear surfaces on said case.

15. The apparatus of claim 14 wherein the exterior and interior heights are substantially constant, respectively.

16. The apparatus of claim 2 wherein said body portion has a normal position wherein said leading surface is disposed generally vertically, said cavity being offset upwardly from the center of said leading surface.

17. The apparatus of claim 16 wherein said shank is offset downwardly from the center of said leading surface.

18. A fishing lure system comprising:
a rigid head portion;
a body portion having a leading surface adjacent said head portion and extending rearwardly therefrom, and a rattle cavity having a mouth opening through said leading surface;
and a rattle assembly removably disposed in said cavity, said rattle assembly comprising a hard, hollow case having height extending generally parallel to said leading surface, length extending generally parallel to the front-to-rear dimension of said body portion, and width extending generally laterally of said body portion, the exterior length and width being substantially greater than the exterior height, the relative sizes of the interior dimensions being similar to those of the exterior dimensions, and rattling means disposed loosely in the hollow of said case, said rattling means having a maximum dimension less than the minimum of the interior height;

there being means cooperative between said head portion and said body portion to releasably retain said leading surface adjacent said head portion thereby preventing loss of said rattle assembly from said cavity.

19. The apparatus of claim 18 wherein said body portion has a normal position wherein said leading surface is disposed generally vertically; said cavity being offset upwardly from the center of said leading surface.

20. A fishing lure system comprising:
a spoon-type lure body having an internal chamber;
a thin, rigid insert removably disposed in said chamber, said insert having a hole disposed therein; and
a rattle assembly removably disposed within said hole in said insert; said hole within said insert being sized for removable receipt of said rattle assembly.

21. A flexible body for a weighted head type fishing lure having a leading surface, a portion adapted for receipt of a shank on a weighted head, and a preformed rattle cavity opening through said leading surface and radially offset from but laterally aligned with said shank receipt portion.

22. The body of claim 21 having a preformed shank cavity in said shank receipt portion.

23. The body of claim 21 wherein said rattle cavity has height extending generally parallel to said leading surface, length extending generally parallel to the front-to-rear dimension of said body portion, and width extending generally laterally of said body portion; and wherein the length and width are substantially greater than the height.

* * * * *